May 5, 1925.
E. S. FARROW, JR
1,536,334
PROCESS OF RECOVERING ACETIC VALUES FROM A CELLULOSE ACETATE MIXTURE
Filed April 19, 1924
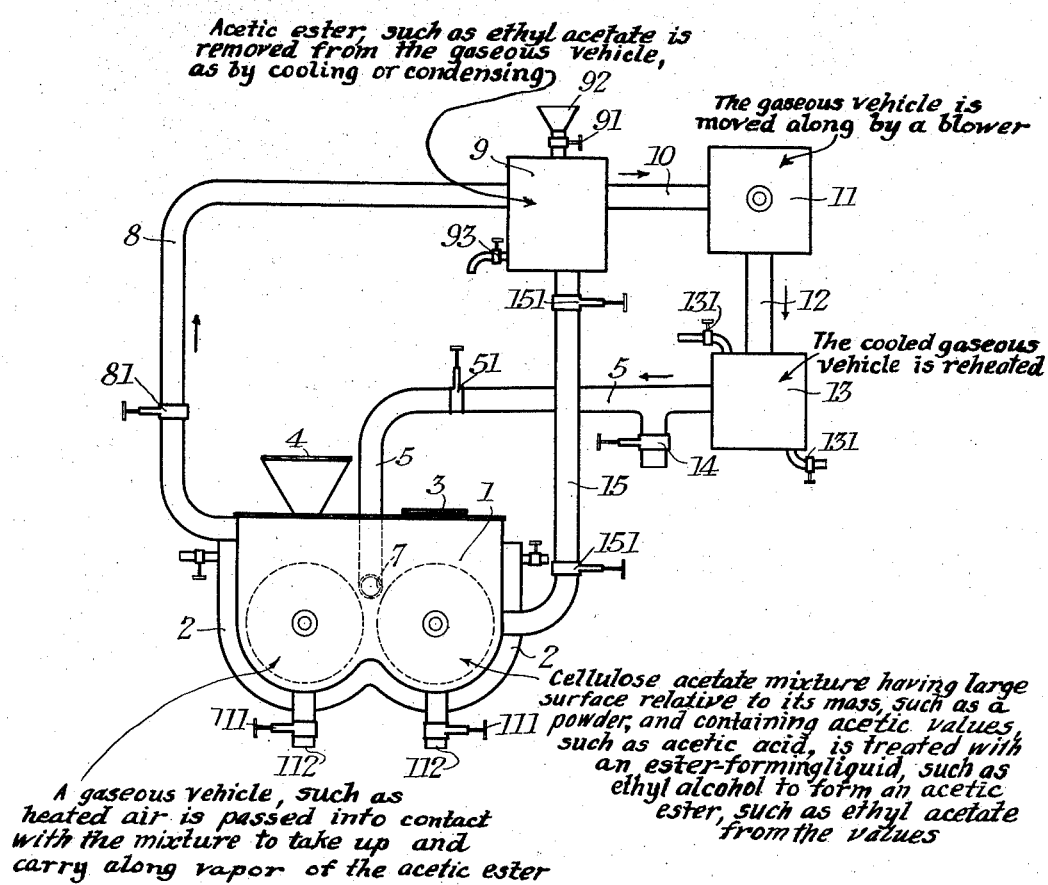
INVENTOR,
Edward S. Farrow, Jr.
BY
ATTORNEY Patented May 5, 1925.

1,536,334

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF RECOVERING ACETIC VALUES FROM A CELLULOSE-ACETATE MIXTURE.

Application filed April 19, 1924. Serial No. 707,775.

*To all whom it may concern:*

Be it known that I, EDWARD S. FARROW, Jr., a citizen of the United States of America, residing at Rochester, in the county of Monroe and State of New York, have invented certain new and useful Improvements in Processes of Recovering Acetic Values from a Cellulose-Acetate Mixture, of which the following is a full, clear, and exact specification.

This invention relates to processes for recovering acetic values from cellulose acetate mixtures. One object of the invention is to provide a relatively simple process for recovering such values from such a mixture, especially when the latter is already in a form having great surface relative to its mass, such as films, filaments, or powders, like the grains of the intermediate product, for instance, produced by the process described in the patent of Paul C. Seel, No. 1,494,816, granted May 20, 1924, for process of manufacturing cellulose acetate. Another object of the invention is to provide a rapid and easily controlled process for transforming said values, and then separating them out in transformed condition. Other objects will hereinafter appear.

In the accompanying drawing, the single figure is a diagrammatic side elevation, showing one form of apparatus in which my process may be carried out, the relative sizes of the parts being exaggerated for the sake of clearness.

A cellulose acetate reaction mixture containing intially cellulose, acetic anhydride, acetic acid and sulfuric acid, or some other well known condensing agent, may be converted into forms having great surface relative to its mass, such as films, filaments, and powders, after the reaction has reached the proper stage. Taking the powder for illustration, it can be produced by simultaneously agitating the mixture and evaporating off the excess of acetic values. The grains of powder, when evaporation is carried to the proper point, do not coalesce upon standing at room temperature and pressure, in spite of the fact that they still contain some residual acetic values, such as acetic acid or acetic anhydride or acetyl chloride, or mixtures of these. Because the powder has a very large surface relative to its mass, it can be rapidly treated with liquids; such treatment, moreover, will be uniform with respect to practically all of the particles, thus insuring substantial homogeneity as a result of the fluid treatment. This is also true of films and filaments made from the reaction mixture.

When a powdery mass is produced from a cellulose acetate reaction mixture, in which the cellulose acetate is in solution prior to the powder-forming operation the drying out of the acetic values from the grains can be readily carried out to different degrees. While very large amounts of acetic values can be removed by continued agitation and blowing of air or other suitable gas through the powder, nevertheless it is preferable for economic reasons to carry the drying only to the point where the acetic values form about one-half to one-tenth the weight of the powder. For example, it is economical to extract the acetic values by evaporation until the residue of them amounts to approximately 30% of the weight of the powder. There is a corresponding residue when acetic values are similarly evaporated from films, filaments and the like.

My invention is concerned with the inexpensive removal of and recovery in useful form of this residue. While the films, filaments, or powders containing the above mentioned percentages of acetic values may be useful in those forms for many purposes, it is often desirable to free them almost entirely from such values. I have found that this can be done by reacting upon these values to form useful volatile compounds, the latter being evaporated and such compounds recovered by absorption, condensation or the like. In the preferred form of my invention, I promote, as by warming, a reaction between the acetic values in the powder, films, or filaments, and an alcohol, such as ethyl alcohol, until an ester, such as ethyl acetate, is produced. A gaseous vehicle, such as air, is blown into contact with the mixture to take up and carry away vapors of said esters, together with vapors of any excess of alcohol. At a removal station of any suitable type, such as a condenser, the vapors are removed from the air. The recovered alcohol with its content of ester may be used over again one or more times, if necessary, the percentage of ester increasing at each stage. Any of the original condensing agent left in the reaction mass does not interfere with the esterification, and often assists it.

My method may be carried out in many specifically different ways. One of these will now be described for purpose of illustration in connection with a powder, but it will be understood that the invention is not restricted to this particular way, nor to a powder.

Referring to the accompanying drawing, 1 represents an enclosed mixer, say of the type illustrated in U. S. Patent No. 534,968, Pfleiderer, Feb. 26, 1895. Its temperature may be controlled by any suitable means, such as a jacket 2, through which hot water or steam may be circulated. Suitable covers and charging fixtures 3 and 4 are provided in the top, these being normally substantially gas-tight when in position.

Through the top of the mixer there enters the gas or air pipe 5 which joins with a transverse perforated pipe 7 in the mixer, said pipe 7 just clearing the rotary blades, and its perforations being on its lower side to direct fine currents of the gaseous vehicle into the contents of the mixer. Near the top of the mixer there is an exit pipe 8 through which the gaseous vehicle, such as air, passes with its contained vapors to condenser 9, where the vapors, or large fractions of them, are removed by cooling, as will be understood by those skilled in the art.

The gas passes from condenser 9 by pipe 10 to the impeller or blower 11, upon which its movement chiefly depends. From this it passes through pipe 12 and through reheater 13, where it is suitably warmed before its passage along pipe 5 to the mixer. Pipe 5 may have a valve-controlled exit 14 to the air for use when necessary. Suitable control valves will, of course, be placed throughout the system, such as valve 81 in pipe 8, 51 in pipe 5, 131 in the pipes leading to the warming jacket of heater 13, 91 in the charging pipe 92 of condenser 9, and 111 in the drain pipes 112 in the bottom of mixer 1.

The liquids produced by the condensation of vapors in condenser 9 may be drawn off in any suitable way, say by valve-controlled exit pipe 93, or they may be allowed to flow downward by gravity through pipe 15, the latter being controlled by any suitable valves 151.

My process begins with a charge of powder present in mixer 1, this powder preferably being, as above stated, of the type produced by the process described in the hereinabove cited Seel patent. It normally contains under 50% of acetic values, say 30% by weight. Ethyl alcohol, say the commercial variety having a strength of 95%, or even greater, is then charged into the mixer until it fills up the interstices between the grains of powder. Of course, a smaller proportion can be employed, provided it is thoroughly mixed in with the particles. While I can use successive charges of alcohol, each less than an equimolecular weight of acetic values which are present, I prefer to use a single charge in which the weight of alcohol is greater than that necessary to combine with the acetic values which are present. In fact, an excess of alcohol, say up to 5 mols. of alcohol to 1 mol. of acetic acid, tends to increase the completeness to which the reaction proceeds.

The mixer is put in action and the mass brought to a temperature at which reaction between the alcohol and acetic values, especially the acetic acid and any acetic anhydride that may be present is properly promoted without endangering the quality of the cellulose acetate. While temperatures above room-temperature, even up to and including the boiling points of ethyl alcohol and ethyl acetate may be employed, a temperature slightly under boiling, say 75° C., is especially useful. The continued agitation and warming is kept up until esterification takes place, the acetic values coming out even from the interiors of the particles. During this stage of the process the valves 81, 51 and 151 are preferably kept closed. Of course, all entrances and exits 3, 4 and 111 to mixer 1 are likewise kept shut.

When the reaction has proceeded to the proper stage, valves 81 and 51 are opened and the gaseous vehicle, such as air, is circulated through pipe 8, condenser 9, blower 11, pipe 12, heater 13, and pipe 5 to perforated distributor pipe 7. This gas may preferably be at the above mentioned temperature of the ingredients in mixer 1, the warming fluid for heater 13 being controlled by valves 131 for this purpose, as will be obvious. Exit 14 is also preferably closed. The gas, bubbling and agitated through the mixture of powdery grains, ethyl acetate and unchanged ethyl alcohol, takes up vapors of the ester and alcohol and carries them to the condenser 9. Here the greater part of the vapors are condensed, giving a liquid mixture of ethyl acetate and alcohol. The cooled air then is moved by blower 11 to heater 13, where it is reheated and passed to distributing pipe 7, from when it repeats the cycle until the liquids are effectually dried out from the powder in mixer 1. This leaves the powder in a highly purified form, substantially free from acetic values and ready for treatment with solvents or hydrolyzing agents as the case may be. By reason of its great surface relative to its mass, such agents act upon all grains of the powder uniformly, giving homogeneous results.

The mixed ethyl acetate and alcohol in condenser 9 may be conducted away. For this purpose they may be removed through valve controlled exit pipe 93.

When there is a considerable excess of alcohol and it is desired to bring the percentage of ethyl acetate in the condensed liquids up to the point where they are more readily usable or salable in this art, the mixed alcohol and ethyl acetate from condenser 9 may be allowed to descend through pipe 15 into mixer 1 by temporarily opening valves 151. In this way a reaction of the excess alcohol with the acetic values of a new charge may be brought about, and thus the percentage of ester will be increased to the desired commercial amount, subsequent blowing with air and condensation being carried out as described above. By leaving valves 151 open during the blowing operation, the condensed liquids can continually descend through pipe 15 and thus repeatedly pass through the steps of reacting, vaporizing and condensing, the air being continually circulated as before. This produces a result in the nature of a reflux condenser action. I prefer, however, to carry out the steps with the valves 151 closed, as hereinabove described.

While I prefer to use ethyl alcohol, it will be clear that other volatile alcohols may be employed, such as methyl, propyl, butyl, and amyl alcohols, either alone or in mixtures. The use of the higher boiling members of this series slows down the process, however, and, therefore, ethyl alcohol is preferred, because it enables the acetic values to be quickly and economically recovered in the form of a commercially important solvent,— ethyl acetate.

Having thus described my invention, what I claim as new and desire to secure by Letters Patent is:

1. In that process of making cellulose acetate which includes the recovery of acetic values from a cellulose acetate mixture in a form having great surface relative to its mass, the steps of treating said mixture with an ester-forming liquid, which is a non-solvent of cellulose acetate and chemically inert with respect thereto, until an acetic ester is formed from said acetic values and said liquid, and recovering said ester from said mixture.

2. In that process of making cellulose acetate which includes the recovery of acetic values from a cellulose acetate mixture containing the same, said mixture being in a form having great surface relative to its mass, treating the mixture with an alcoholic liquid until an acetic ester is formed from said values and said liquid, separating vapors of said ester from said mixture and liquefying said vapors.

3. In that process of making cellulose acetate which includes the recovery of acetic values from a cellulose acetate mixture containing the same, said mixture being in a form having great surface relative to its mass, treating the mixture with an excess of alcohol until an ester is formed from said values and said alcohol, passing a gaseous vehicle adjacent the surface of the mixture to carry away vapors of said ester and of the excess of alcohol and liquefying said vapors.

4. In that process of making cellulose acetate which includes the recovery of acetic values from a granular cellulose acetate mass containing said values in the granules, the steps of treating said mass with a volatile alcohol, which is a non-solvent of cellulose acetate and chemically inert with respect thereto, until a volatile acetic ester is formed from said alcohol and said acetic values, separating vapors of said ester from said mass, and condensing said vapors.

5. In that process of making cellulose acetate which includes the recovery of acetic values from a granular cellulose acetate mass containing said values in the granules, the steps of treating said mass with a volatile alcohol, which is a non-solvent of cellulose acetate and chemically inert with respect thereto, within a temperature range from the boiling point of said alcohol to room temperature until a volatile ester is formed from said alcohol and said acetic values, vaporizing said ester removing its vapors from the mass, and condensing said vapors.

6. In that process of making cellulose acetate which includes the recovery of acetic values from a granular cellulose acetate mass containing said values in the granules, the steps of agitating said mass with a monohydroxy aliphatic alcohol containing less than six carbon atoms until the acetic ester of said alcohol is produced, passing a gaseous vehicle through said mass to carry away vapors of said ester and separating said ester from said vehicle.

7. In that process of making cellulose acetate which includes the recovery of acetic values from a cellulose acetate mass in the form of granules which do not coalesce at room temperature and pressure, but contain acetic acid, the step of agitating said mass with an excess of ethyl alcohol within the temperature range from the boiling point of the alcohol to room temperature until acetic acid is removed from said granules and esterified to ethyl acetate, evaporating off said ethyl acetate and the residue of said alcohol and condensing them.

8. The process which includes the steps of agitating cellulose acetate particles containing less than 50% of acetic acid with an excess of ethyl alcohol at 75° C. until the acetic acid is removed from the particles and converted to ethyl acetate, blowing air into contact with said particles to take up and carry away vapors of the residual alcohol and ethyl acetate, and condensing and separating said alcohol and ethyl acetate.

Signed at Rochester, New York this 7th day of April 1924.

EDWARD S. FARROW, Jr.